United States Patent [19]
Hashimoto

[11] 4,034,215
[45] July 5, 1977

[54] DECORATIVE LIGHT DISPLAY

[76] Inventor: Hideo Hashimoto, 2618 Desert St., P.O. Box 1182, Rosamond, Calif. 93560

[22] Filed: Apr. 23, 1976

[21] Appl. No.: 679,802

[52] U.S. Cl. .............................. 240/10 L; 84/464
[51] Int. Cl.[2] ...................... A63J 17/00; F21P 1/02
[58] Field of Search ............... 240/2 R, 10 P, 10 Q, 240/10 L, 10 R, 2 L, 1 LP; 84/464

[56] References Cited

UNITED STATES PATENTS

| | | | |
|---|---|---|---|
| 3,226,601 | 12/1965 | Cramer et al. ................ | 84/464 UX |
| 3,307,443 | 3/1967 | Shallenberger ....................... | 84/464 |
| 3,431,410 | 3/1969 | Dolan et al. .................. | 240/10 L X |
| 3,540,343 | 11/1970 | Rifkin ................................ | 84/464 |
| 3,624,385 | 11/1971 | Wall ................................. | 240/10 L |

FOREIGN PATENTS OR APPLICATIONS 1,537,069  7/1968  France .............................. 240/10 R

*Primary Examiner*—Donald A. Griffin
*Attorney, Agent, or Firm*—Criddle, Thorpe & Western

[57] ABSTRACT

A decorative light display includes a chassis having a base housing and a back panel extending upwardly from a rear edge of the housing. Three fiber optic spray assemblies, each having a lamp and a bundle of optical fibers positioned to carry light produced by the lamp, are mounted on top of the base housing so that the optical fibers extend upwardly in front of the back panel. A control unit produces three signals representing the treble, mid and bass range of a stereo output and each signal is applied to a different one of the fiber optic spray assemblies to illuminate the corresponding lamp, the intensity of the light produced by the lamp varying as the respective signal from the control unit varies. A plurality of vertically oriented mirrored panels are fixed in the back panel behind the spray assemblies, each mirrored panel being positioned at substantially a right angle with respect to immediately adjacent panels. A fan is located in the base housing to blow air upwardly through openings in the top wall of the housing against the optical fibers to cause the fibers to move.

9 Claims, 5 Drawing Figures

DECORATIVE LIGHT DISPLAY

BACKGROUND OF THE INVENTION

This invention relates to a decorative light display and more particularly to a light display adapted for use with a stereo system wherein light produced by the light display varies with variations of an audio signal produced by the stereo system.

It is well known to vary the intensity of lamps in accordance with variations of an audio signal. See, for example, U.S. Pat. No. 3,540,343 issued to Marvin R. Rifkin. It is also well known to utilize bundles of optical fibers, one end of which is positioned adjacent to a source of illumination, for providing decorative illumination ornaments. See, for example, U.S. Pat. Nos. 3,721,815 issued to Lamar J. Wall and 3,727,044 issued to Jeffrey L. Monroy. The former type apparatus is especially popular for use with stereophonic sound production both in entertainment facilities and private facilities. Such use typically involves projection of varying light images or patterns onto a screen. The use of the latter type devices has generally been limited to structure designed as decorative replacements for standard incandescent lamps such as christmas tree lamps.

SUMMARY OF THE INVENTION

It is an object of the present invention to provide a novel decorative light display.

It is also an object of the present invention to provide a light display which utilizes a plurality of fiber optic spray assemblies to produce for direct viewing multicolored and varying light images and patterns.

It is a further object of the present invention to provide a light display which utilizes fiber optic sprays and apparatus for causing movement of such sprays.

It is still another object of the present invention to provide a light display in which the light produced by light sources is reflected and multiplied by a background panel having a novel arrangement of mirrored surfaces.

The above and other objects of the invention are realized in an illustrative embodiment which includes a base housing, a plurality of fiber optic spray assemblies mounted on top of the housing, each assembly including a socket mounted in the base housing, a lamp disposed in the socket, and a bundle of optical fibers carried by the socket so that one end of each fiber is positioned adjacent the lamp and the other end extends upwardly above the housing. A control means responsive to an audio input signal supplies power to the lamps, with the power varying with variations in the audio signal. In accordance with one aspect of the invention, a fan is disposed in the base housing to blow air upwardly through a plurality of openings in the top wall of the housing to cause the optical fibers to move. In accordance with another aspect of the invention, a plurality of vertically oriented mirrored panels are disposed behind the fiber optic spray assemblies with each mirrored panel being positioned at substantially a right angle with respect to immediately adjacent panels. The described decorative light display can be used either for entertainment or as a novel night light.

BRIEF DESCRIPTION OF THE DRAWINGS

The above objects, features and advantages of the present invention will become apparent from a consideration of the following detailed description presented in connection with the accompanying drawings, in which.

DETAILED DESCRIPTION

Figure 1:
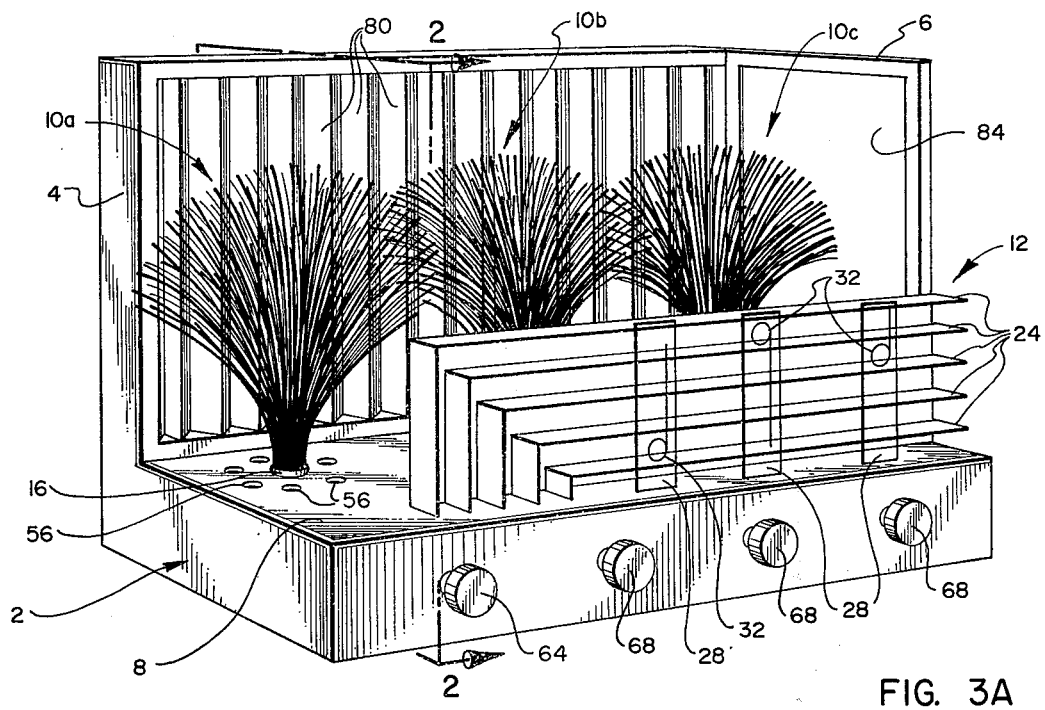
FIG. 1 shows a perspective view of a decorative light display made in accordance with the principles of the present invention.

A perspective view of the decorative light display of the present invention is shown in FIG. 1. The display includes a chassis having a base housing 2 and a back panel 4 extending upwardly from the rear edge of the base housing. A side panel 6 extends upwardly from a side edge of the base housing 2 and forms a substantially right angle with the back panel 4. The base housing 2, back panel 4 and side panel 6 may be constructed of any suitable material including plastic, metal, or wood.

Figure 2:
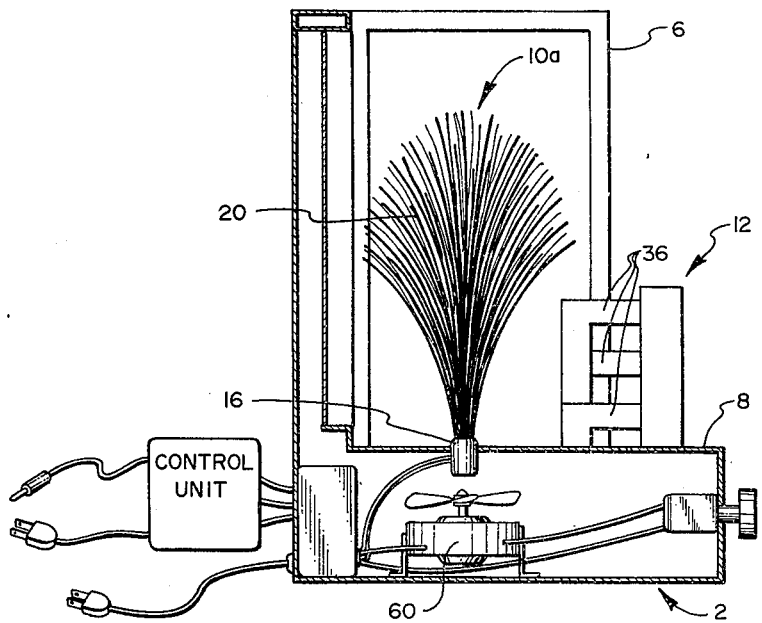
FIG. 2 shows a side cross-sectional view of the light display of FIG. 1 taken along lines 2—2.

The base housing 2 includes a top wall 8 (FIG. 2) on which are mounted three spray assemblies 10 and a structure 12 formed to simulate a musical staff. Each spray assembly 10 is comprised of a socket 16, a lamp 18 (FIG. 3B) mounted inside the socket, and a bundle of optical fibers 20 bunched for insertion in a top opening of the socket 16 so that one end of each optical fiber is disposed adjacent to the lamp 18. The optical fibers extend upwardly from the socket 16 and, being flexible, spread apart and partially droop at the top thereof as generally indicated in FIGS. 1 and 2. With this arrangement, when the lamps 18 are illuminated, light is transmitted from the bundled ends of the optical fibers upwardly through the fibers to the free ends thereof.

The structure 12 formed into a simulated musical staff comprises five generally flat elongated strips of material, such as plastic, arranged one above the other in a parallel fashion. One end of each of the strips of material turns downwardly to form a right angle and contact and rest upon the upper wall 8 of the base housing 2 as generally shown in FIG. 1. Three vertically oriented strips 28, also advantageously composed of plastic, are fixed to and support the five horizontally disposed strips 24. The bottom end of each of the strips 28 rests upon the top wall 8 of the base housing 2 to thereby maintain the strips 24 in place. Glue or other adhesive may be used to fix the vertical strips 28 to the horizontal strips 24 and to the top wall 8 of the base housing. Outlined on each of the vertically oriented strips 28 are musical notes 32. The notes 32 are illuminated by respective tubular members 36 (FIG. 2) mounted on the top wall 8 of the base housing 2 and extending generally vertically upwardly and then horizontally to a location just behind a corresponding note. In other words the tubular members 36 are formed in an inverted L shape, as shown in FIG. 3A, wih the long leg of the member being oriented vertically and the short leg being oriented horizontally.

Figure 3A:
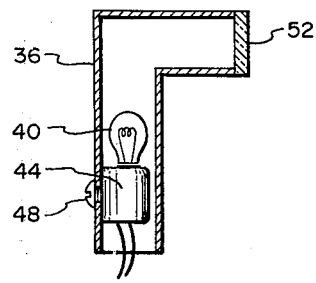
FIG. 3A shows a side cross-sectional view of the tubular members 36 of FIG. 2.
Figure 3B:
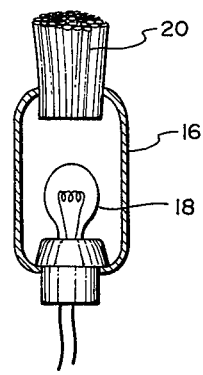
FIG. 3B shows a side cross-sectional view of the fiber optic spray sockets 16 of FIGS. 1 and 2.

As shown in FIG. 3A, a lamp 40 and socket 44 are disposed in the vertical leg of the tubular member 36 with the lamp being directed upwardly therein. A set screw 48 extends through an elongate vertical slot in the tubular member 36 and into a threaded opening in the socket 44. The purpose of the set screw 48 is to enable positioning the lamp 40 and socket 44 at various vertical distances in the tubular member 36. In other words the lamp 40 and socket 44 may be moved to any of a variety of elevations in the tubular member 36 and the set screw 48 tightened to hold the lamp 40 and socket 44 in place. With this arrangement, the lamp 40 may be positioned at the top of the vertical portion of the tubular member 36 to project light directly out the free end of the horizontal portion of the member or the lamp may be positioned at a lower elevation in the vertical portion of the tubular member 36 so that only indirect light is projected out the free end of the horizontal portion of the tubular member 36. Advantageously, the tubular members 36 are constructed of aluminum to enable radiation therefrom of excess heat.

Various colored light filters 52 (FIG. 3A) may be positioned over the free end of the horizontal portion of the tubular members 36 to thereby provide various colors for the notes 32. The tubular members 36 would be positioned so that the filters 52 would be immediately behind corresponding notes 32.

A plurality of openings 56 are located in the top wall 8 of the base housing 2 about each of the sockets 16 of the spray assemblies 10 as shown in FIG. 1. A fan 60 is mounted inside the base housing 2 beneath the openings 56 and is oriented to blow air upwardly through the openings 56 and against the optical fibers 20 to cause the optical fibers to sway and move. Either one or a plurality of fans 60 could be utilized but in either case they would be positioned to direct air through the openings 56. Also, a variety of different types of air blowing apparatus could be utilized. In addition to causing the optical fibers 20 to sway and move, the fan 60 functions to cool the fiber optic spray assemblies 10 and also the base housing 2.

Figure 4:
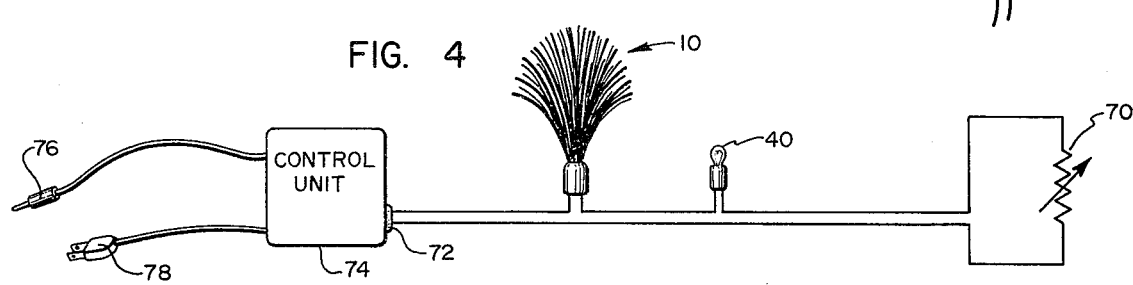
FIG. 4 shows the circuitry for energizing the fiber optic spray assemblies and lamps of the light display of FIGS. 1 and 2.

A plurality of control knobs 64 and 68 are located on the front wall of the base housing 2 to control the intensity of the lamps 18 and 40 and to turn the fan on and off. Control knob 64 is provided to turn the fan 60 on and off and the three control knobs 68 each control one lamp of a fiber optic spray assembly 10 and one musical note illumination lamp 40. An exemplary circuit for controlling the light intensity of a fiber optic spray lamp and a musical note illumination lamp is shown in FIG. 4. This circuit comprises simply the lamp of the fiber optic spray 10 coupled in series with a lamp 40, used to illuminate a musical note, and with a rheostat 70 which is operated by one of the control knobs 68. This series connection is coupled by way of a plug 72 into a control unit 74 such as the color control unit manufactured by Science Fair, Inc. The control unit 74 in turn may be plugged into the audio output of a stereo system by means of a jack 76 and into a power source by means of a plug 78 to operate and produce signals representing the treble, middle and bass range of the stereo output. These three signals are then applied by the control unit 74 to respective circuits of each of the three fiber optic spray assemblies and musical note illumination lamps. That is, three circuits of the type shown in FIG. 4 would each be plugged into the control unit to receive one of the three signals produced by the control unit. Each of the three signals varies in magnitude as the corresponding treble, middle and bass components of the audio output of the stereo system varies. Variation in the three signals, in turn, causes the intensities of the fiber optic spray assembly lamps 18 and the musical note illumination lamps 40 to vary. By adjusting the rheostats 70 by way of control knobs 68, the intensities of the lamps can also be controlled manually.

With the light intensity of the various lamps varying according to the audio output of a stereophonic system and with the optical fibers 20 moving in response to air currents created by the fan 60, a novel visual impression is created. To multiply or amplify the visual impact, a plurality of vertically oriented elongated panels 80, silvered or mirrored on one side thereof, are arranged in the back panel 4 immediately behind the fiber optic spray assemblies 10. Each of the panels 80 might illustratively be an elongated mirror or silver metalic strip. The panels are oriented at substantially right angles with respect to immediately adjacent panels as shown in FIG. 1 to present a type of corregated appearance. The effect of providing the mirrored panels 80 is to increase and multiply the reflection of light from the fiber optic spray assemblies and thereby increase the visual impact of the light display.

The side panel 6 also includes a mirror 84 mounted on one face of the panel to provide additional reflection and multiplication of the light produced by the fiber optic spray assemblies 10. The panel 6 is adapted to be removable from the display so that the user may either include the panel or remove it.

It is to be understood that the above described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is

1. A decorative light display comprising
   a chassis having a base housing and a back panel extending upwardly from a rear edge of the base housing
   a plurality of fiber optic spray assemblies, each including a lamp and optical fibers, mounted on top of the base housing so that the optical fibers extend upwardly in front of the back panel,
   means responsive to an audio input signal for supplying power to said lamps, said power varying with variations in the audio signal, and
   a plurality of vertically oriented mirrored panels fixed in said back panel adjacent the spray assemblies, each mirrored panel being positioned at substantially a right angle with respect to immediately adjacent mirrored panels.

2. A display as in claim 1 wherein said power supplying means is responsive to the audio signal for producing a first power signal which varies with variations in a bass component of the audio signal, a second power signal which varies with variations in a middle component of the audio signal, and a third power signal which varies with variations in a treble component of the audio signal, and wherein the fiber optic spray assemblies include at least three assemblies, each of which is coupled to said power supplying means to receive a different one of said power signals.

3. A display as in claim 2 further comprising five horizontally disposed substantially parallel strips, formed to simulate a musical staff and mounted on top of the base housing, and means for projecting light to said strips, each of said light projecting means coupled in series with a different one of said spray assemblies.

4. A display as in claim 3 further comprising manually operable means for individually controlling the magnitude of the power signals applied to said spray assemblies.

5. A display as in claim 3 wherein each of said light projecting means comprises a tubular member formed into an inverted L having a vertical portion and a horizontal portion, the free end of said horizontal portion positioned behind said strips, and a lamp slidably disposed in the vertical portion of the tubular member.

6. A display as in claim 5 wherein each of said light projecting means further comprises a light filter disposed over the free end of the horizontal portion of the corresponding tubular member.

7. A display as in claim 1 further comprising a mirrored panel extending upwardly from a side edge of the base housing and disposed substantially at a right angle to said back panel.

8. A display as in claim 1 wherein the top of said base housing has a plurality of openings positioned about the fiber optic spray assemblies, said display further comprising means disposed in said base housing beneath said openings for blowing air upwardly through the openings against the optical fibers.

9. A decorative light display comprising
a base housing including a top wall having a plurality of openings therein,
a plurality of fiber optic spray assemblies mounted on top of the base housing, each assembly comprising a socket mounted in the base housing, a lamp disposed in the socket, and a bundle of optical fibers carried by the socket so that one end of each fiber is positioned adjacent the lamp and the other end extends upwardly above the base housing,
means responsive to an audio input signal for supplying power to said lamps, said power varying with variations in the audio signal, and
means disposed in said base housing for blowing air through the openings in the top wall of the housing against the optical fibers of said spray assemblies.

* * * * *